United States Patent Office 3,698,852
Patented Oct. 17, 1

3,698,852
AMINO ACID/PHENYLAMINE REACTANT-DYES
FOR KERATINOUS FIBERS AND LIVING HAIR
Myron Pantzer, Englewood, and Milton Feier, Tenafly,
N.J., assignors to Apod Corporation, Englewood, N.J.
No Drawing. Continuation-in-part of applications Ser. No.
701,313 and Ser. No. 701,352, both Dec. 9, 1957, and
Ser. No. 135,433, Sept. 1, 1961, and Ser. No. 147,123,
Oct. 16, 1961. Said applications Ser. No. 135,433 and
Ser. No. 147,123 are continuations-in-part of applications Ser. No. 701,350 and Ser. No. 701,351, both Dec.
9, 1957, all abandoned. This application May 27, 1965,
Ser. No. 459,427
Int. Cl. A61k 7/12
U.S. Cl. 8—10.2                                       19 Claims

ABSTRACT OF THE DISCLOSURE

The invention relates to reactant-dyes of dihydroxyphenylalanine and/or dihydroxyphenylglycine and at least one phenylamine. It also relates to the preparation of the aforementioned dyes, compositions thereof and methods of dyeing keratinous fibers, especially living hair therewith.

---

This application is a continuation-in-part of our copending applications Ser. Nos. 701,313 and 701,352, both filed on Dec. 9, 1957, and Ser. No. 135,433 filed on Sept. 1, 1961 and Ser. No. 147,123 filed on Oct. 16, 1961, which latter two are separately a continuation-in-part of our then copending applications Ser. Nos. 701,350 and 701,-351 respectively, both of which were filed also on Dec. 9, 1957; all of which applications are now abandoned.

This invention is that of reactant-dye preparations derived from reaction, under alkaline conditions, between (a) at least one dihydroxyphenylalanine and dihydroxyphenylglycine, in both of which the hydroxyl groups are ortho to one another, particularly a 3,4-dihydroxyphenylalanine and 3,4-dihydroxyphenylglycine, and especially beta-3,4-dihydroxyphenylalanine and alpha-3,4-dihydroxyphenylglycine; and (b) at least one phenylamine of the general formula

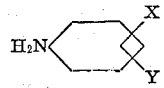

wherein X is hydrogen, or a substituent, for example, methyl, methoxy, or the nitro, amino, or sulfonic or carboxylic acid group; Y is the hydroxyl group or the group —NHR wherein R is hydrogen or lower alkyl with up to six carbons such as methyl, ethyl, butyl, or the carboxymethyl or acetyl group; and when Y is the hydroxyl group, X is hydrogen or the amino group; and when Y is the amino group —NHR, X is as it is earlier defined other than the amino group; and particularly such phenylamine wherein Y is para to the amino group shown in said general formula.

These new reactant-dye preparations are unusually suitable for dyeing keratinous materials and particularly so for dyeing living hair, because the oxidation dyeing solutions made from them are substantially free of the sensitization-provoking character, and thus lack such undesirable shortcomings, manifested by the phenylenediamine, toluenediamine, aminophenol (whether unsubstituted or ring- or N-substituted), hair dyes.

The invention includes also the method of making these reactant-dyes and also of keratinous fibers, especially living hair, with the oxidation, especially the fresh oxidation, products of these dyes, to give dyeings fast to light and washing.

Hereinbelow beta-3,4-dihydroxyphenylalanine is briefly called "dopa," alpha-3,4-dihydroxyphenylglycine is b called "dop-G;" and para-phenylenediamine also i ferred to as "PPDA."

By "fresh oxidation product" is meant that reac dye preparation containing the reaction product bet (a) the hereinabove disclosed dihydroxyphenylal; and/or dihydroxyphenylglycine and (b) the parti phenylamine, promptly after adding an oxidizing age their reaction product, i.e. usually within a few or eral minutes after the oxidizing agent was added an fore appreciable oxidation of the reaction produc curs. In other words, the ready dyeing solution res after the action of the oxidizing agent on the reactan preparation is the fresh oxidation product.

The dye preparations of this invention are called "r ant-dyes" because, in dyeing keratinous materials su hair with them, the indications are that there appar occurs some kind of reaction between those mate e.g. hair and the dyeing solution composition rather a mere surface coloring.

Heretofore, the most widely used and commonly mercially available hair dyes, particularly for living have been those based on PPDA and substances si to it such as toluene-diamines, and aminophenols. P and its derivatives and such substances like it, some jointly being called the "PPDA family dyes," also been used widely in fur dyeing. Their use in these has not been entirely satisfactory because of certai fortunate disadvantages they possess.

These former PPDA family, and aminophenols, dyes possess certain sensitizing reactions and toxic tations that provoke distress not only with persons dling and working with them, but especially also many whose hair is dyed with them. Accordingly, tain countries prohibit their sale; while others, fo ample, the United States of America, permit thei only under certain restrictions, for example, that labels bear a warning mentioning their sensitizing toxic characteristics. They also specify that a patcl should be made to determine absence of sensitivity t dyes before they are used.

A significant disadvantage in the use of either of or dop-G alone for dyeing hair is in the limitation i ing only light brown and blonde shades, and the to re-dye to build up color even in this part of the r The reaction dyes of this invention lack the undesi characteristics of the PPDA family, and the ar phenols, dyes and the shortcomings and limitation t light color range of dopa and dop-G. These new rea dyes in addition to being harmless to users and c handling them, provide natural appearing colors shades over a wide color span from light blond dark brown and black.

These reactant-dyes of the invention are obtained the method of their preparation is carried out, by a ing (a) the selected phenylamine, i.e. aminophenol, enediamine or phenylenediamine, for example, a phenylenediamine such as PPDA and (b) an afoi dihydroxyphenylglycine such as dop-G and/or an a said dihydroxyphenylalanine as dopa, to react witl another in an aqueous medium under alkaline cond and in proportions, say, of at most about three mo PPDA, and preferably about two mols of it, per n dopa, and until the reaction has become substantial active. By "the reaction has become substantially ina is meant that stage at which the color that develops the reaction appears no longer to become any darker is to say, appears to give no further increase in depth.

While it is advantageous to use the reactants ii proximatey equimolar proportions, the proportion ried to under, and even considerably less than, about
nol of the phenylamine, e.g. PPDA, per mol of dopa
or dop-G. The higher the ratio of the phenylamine to
opa and/or dop-G (preferably without exceeding the
num of about three moles of PPDA per mol of
), the darker the color; with the blacks, very dark
ns and dark auburns obtainable from the highest to
r ratios and the very light browns and blondes re-
g from the lower to lowest proportions.
ictically directly after the joint inclusion of the di-
oxyphenylalanine such as dopa and/or the dihy-
phenylglycine such as dop-G and the aminophenol
or the diamine such as PPDA in the aqueous alkaline
im, color formation commences and increases in
until the reaction becomes substantially inactive.
generally occurs in from about five to about ten
tes, depending on the concentration of reactants in
lkaline vehicle, and in some cases it may occur in
significantly less than five minutes.
e alkalinity can vary from about pH 8 to about
1, and most effectively from about pH 9 to about
0. Below about pH 8 the resulting hair dyes often
ndesirable in that the appearance of hair dyed at
lower pH is quite unnatural and rather dull and un-
tive.
to the method of dyeing keratinous fibers, for ex-
e, hair on the human head, with the reactant-dyes of
nvention, the resulting aqueous reactant-dye solu-
(whether true or colloidal) is mixed with a suitable
ity of a compatible oxidizing agent (either in dry
or as a compatible liquid vehicle or solvent); and
esulting fresh oxidation product or dyeing solution
olied directly to the hair on the head in the usual
er used by beauticians or given in directions with
-use hair dyes. The latter includes, for example, part-
ie hair and applying the fresh oxidation dyeing solu-
by cotton swab or dauber or other applicator to
ite the hair close to the scalp and about two inches
h side of the part line, then parting the hair a short
ice from the first part and repeating the wetting
e hair with the dyeing solution, and continuing in
ir manner until the whole area to be dyed is so
d; and thereafter brushing the hair to brush the
over the entire length of the individual hairs.
ernatively, other keratinous fibers can be immersed
e aqueous mixture of reactant-dye solution and
zing agent, and subjected to the action of the result-
esh oxidation dyeing solution until the desired color
hade develop on them, and then washing off the
, and any excess, dyeing solution with water or good
or compatible synthetic detergent solution.
taking (a) the dihydroxyphenylalanine and/or di-
oxyphenylglycine and (b) the aminophenol and/or
lenediamine in varying proportions to one another
reparing the reactant-dye preparations, and mixing
esulting reactant-dye with the oxidizing agent, such
drogen peroxide, and then applying the resulting
oxidation product dyeing solution, for example, to
ng hair, there are produced colors ranging from
acks (for example, with a ratio of about two and
alf mols of the dopa per mol of PPDA), to browns
vith para-aminophenol and its ring-substituted deriva-
and auburns (as with N-substituted para-amino-
ls) to the palest blondes with a ratio under about
ventieth mol of the phenylamine to about one mol
e dopa and/or dop-G.
e specific ultimate color in the dyed keratinous fiber
as human hair is not only influenced by the rela-
roportions of the various reactants to one another,
lso by such factors as their respective concentration
e aqueous medium, and the length of time that the
oxidation product (i.e. the dyeing solution) remains
itact with the hair or other fiber during the dyeing
or treatment. For example, the reactant dye com-
ons of individual ones of the specific complete ex-
amples below can be diluted separately progressively
with water even up to nineteen parts, or about nine parts
(as with the aminophenol and ring-substituted amino-
phenol reactant-dyes), of water to one of the dye com-
positions, to obtain increasingly lighter colors such as
lighter browns down to very light blondes.

Any form of the dihydroxyphenylalanine such as a
3,4-dihydroxyphenylalanine e.g. dopa and/or of the di-
hydroxyphenylglycine such as a 3,4-dihydroxyphenylgly-
cine as dop-G, whether the synthetic (the racemic form),
natural (the laevo-rotatary form), or dextro-rotatary
form, can be used in preparing these reactant-dye prepara-
tions. The dopa in any of these forms, or the dop-G or
both, can be dissolved alone (at atmospheric tempera-
ture) in the alkaline aqueous medium in a suitable, or
the required, concentration for the formulation for the
particular color to be dyed, or even up to eighteen,
and, if necessary, as much as twenty, percent, or it can be
added to the aqueous liquid medium in its required con-
centration along with the phenylamine such as any of the
applicable aminophenols and/or phenylenediamines, e.g.
the para-phenylenediamine.

The latter can be included also in its required concen-
tration for the particular formulation, and, depending
on the color to be dyed, can be dissolved in an aqueous
medium in a concentration even up to as much as twenty
(20%) percent or as its own aqueous solution, for the
production of the reactant-dye preparation.

Any water-soluble alkalizing agent that will not inter-
fere (i.e. is compatible) with any necessary reactant used
in the formulation, and that will not precipitate the re-
sulting reactant-dye or introduce any possibility of toxic-
ity, or injure the scalp or hide or pelt, at its ultimate
concentration in the oxidation dyeing solution to be
applied to the living or other hair or other keratinous
fiber, can be used. A preliminary test of some selected
alkalizing agent can be made easily to note its compatibil-
ity with the reactants and inability to precipitate the re-
sultant reactant-dye or to introduce possibility of toxicity
or injury to the skin, pelt or hide.

Ammonium hydroxide, because of its freedom from
toxicity over a very wide concentration range and its
economy, is beneficial and favored, especially in its com-
mercially commonly available twenty-eight (28%) per-
cent solution.

However, there can be used in place of, or together
with, the ammonia any other compatible ammonia deriva-
tive alkalizing agent such as a lower alkanolamine, e.g.
mono-, di-, or triethanolamine, or a heterocyclic amine,
e.g. morpholine, or a lower alkyl mono- or diamine, e.g.
monomethylamine, dimethylamine, monoethylamine or
diethylamine. Any of those ammonia derivative alkaliz-
ing agents as well as ammonium hydroxide may be broadly
referred to as an "ammonium alkalizant."

Also as alkalizing agent, any alkaline earth hydroxide,
for example, calcium hydroxide or magnesium hydroxide
(included as an alkaline earth), can be used up to the
limit of its water-solubility and at any concentration that
fails to produce a precipitate with any of the organic or
other reactants. The dissolved alkaline earth hydroxides
are preferred to the alkali metal hydroxides, such as
sodium hydroxide or potassium hydroxide, or carbonates,
such as sodium carbonate and bicarbonate, any of which
also can be used so long as its ultimate concentration in
the final dyeing solution is below that which might pos-
sibly irritate the scalp or skin or injure the hide of the
fur pelt.

Any selected, compatible alkalizing agent should be used
to the extent to give a pH at least about eight and prefer-
ably higher and most effectively between about nine and
about ten and best at around 9.2 to 9.6. Incidentally, dopa
is a buffer and thus, when it is used, it initially may hold
the system at about pH 9.6. Even a mixture of the various
compatible alkalizing agents can be used to give the re-
quired pH.

Whatever alkalizing agent is used, can be added to the aqueous medium before, with, or after, the addition of the organic reactants selected to react together to give the reactant-dye. It may be beneficial initially to use enough alkalizing agent to give a pH of even between about 10.5 and 11. However, when dopa is used, soon after the reactants and reagents are dispersed in the aqueous alkaline vehicle, because of the buffering action of the dopa, the pH initially may become automatically adjusted to about 9.6.

Promptly after some of both the (a) dihydroxyphenylalanine and/or the dihydroxyphenylglycine and (b) the selected aminophenol and/or the phenylenediamine, has dissolved in the aqueous medium, reaction between them occurs. Within a few minutes, and at least usually, within about five to ten minutes, and advantageously always with stirring, this first reaction (i.e. before adding any oxidizing agent) is at least substantially complete, that is to say, becomes substantially inactive. By then all of the reactants have gone into solution and reacted together into a water-soluble, or at least colloidally dispersed, reactant-dye product.

This reactant-dye solution is ready now for the subsequent reaction, for it to be mixed with a suitable compatible oxidizing agent if dyeing of hair or other fiber is to be done promptly thereafter. In any event, this reactant-dye dispersion or solution end product, before being mixed with the oxidizing agent, is a finished product of the invention, and can be used at any suitable time, sooner or later thereafter, on addition of the oxidizing agent, to dye living hair or other keratinous fiber.

Any water-soluble oxidizing agent can be used that is compatible with this water-soluble, or colloidally water-dispersed, reactant-dye product and that does not introduce into the fresh oxidation product or dyeing solution any possibility of its being toxic to the scalp, or injurious to the hair or fur or hide of the pelt, at the ultimate concentration at which it is to be applied.

Such suitable oxidizing agent is also compatible with the reactant-dye when it does not react with the dye to form a water-insoluble precipitate. Hydrogen peroxide, in any of its commercially commonly available strengths, is favored because of its ready availability and low cost. It can be used, for example, as the commercially available twenty volume or in its twenty-five volume strength, or even eight and a quarter volume.

In place of, or together with, the hydrogen peroxide, there can be used any other compatible oxidizing agent such as any other suitable peroxide, for example, an inorganic peroxide such as an alkali metal peroxide like sodium peroxide, or an organic peroxide as urea peroxide, or other water-soluble inorganic oxidizing agent as an alkali metal chlorate, bromate, or perborate such as sodium or potassium chlorate, bromate or perborate. Any of the foregoing, or compatible mixtures of any of them, can be used in preparing the dyeing solutions for dyeing live hair. In wool or fur dyeing any of them, or others, can be used.

For use in dyeing living hair or other keratinous fiber, the reactant-dye product of the invention is mixed with a quantity of the oxidizing agent, whether liquid or solid, sufficient to give a convenient concentration in relation to the concentration of the reactant-dye in its solution and the concentration desired in the oxidized dye solution as it is to be applied to the hair or fur or other keratinous fiber. For example, hydrogen peroxide (twenty volume) can be mixed with the reactant- dye solution usually in an amount of from about one quarter to one-half of, or up to equal parts or even twice, the volume of the reactant-dye solution. The solid oxidizing agents can be granulated or powdered and thus added to, and dissolved in, the reactant-dye solution, although in some cases it is advantageous to dissolve such oxidizing agent separately in water.

The selection and quantity of the oxidizing agent will depend on the condition of the fiber to be dyed, and the color to be developed in the dyeing rate. In some cases, a preliminary test on a trial lock or switch of hair or skein or swatch of wool or patch of fur may be necessary as a guide.

The reactant-dye dispersion and the oxidizing agent (in solution or as solid) are mixed together uniformly to give what can be referred to as the oxidation dye or dyeing solution, for application to the hair. If desired, there can be included a suitable compatible wetting or penetrating agent or other surfactant. It is best that the oxidation dyeing solution be applied to the hair or other fiber promptly after the reactant-dye solution and the oxidizing agent have been mixed, and preferably not more than about ten minutes or so after mixing the reactant-dye dispersion and the oxidizing agent.

The oxidation dyeing solution then can be applied to the hair or other fiber in known manner. Either of these is kept in contact with the dyeing solution for a sufficient time for the desired color and shade of it to develop from the contact with the dye. For most cases, as so far noted, the dyeing time can be from about fifteen to about seventy-five minutes, and often from about a half hour to about an hour. The dyeing reaction between the fiber and the oxidation dyeing solution then is terminated by shampooing and/or rinsing the hair or other fiber to remove the exhausted, and any excess, dyeing solution.

The reactant-dye compositions and oxidation dyeing solutions, and methods, of the invention are illustrated by but not restricted to, the following examples which include also quantities of an oxidizing agent used relative to the reactant-dye solution produced.

(A) PPDA with dopa

Example 1.—Forty grams of finely divided dopa and twenty grams of finely divided PPDA were intimately dry mixed in a five hundred milliliter beaker. Four hundred milliliters of distilled water were added with stirring in a number of small quantities. The resulting mixture as a slurry was transferred to a one-liter volumetric flask and warmed on a water-bath, with occasional swirling, to about 70° C. Fifty milliliters of 'Drene' shampoo (aqueous solution of cocoanut alcohol sulfonates) then were added as the wetting agent and followed by 335 milliliters of a three percent aqueous solution of 'Carbopol' 934 solution as a thickening agent. The mixture was then thoroughly mixed by swirling at a rate low enough to avoid excessive foaming.

The reaction flask was returned to the water-bath and heated to raise the temperature of the mixture to about 70° C. The flask then was removed from the water-bath and one hundred milliliters of concentrated ammonium hydroxide (i.e. containing 28% ammonia) were added slowly with mixing. After solution of the dopa and the PPDA appeared to be complete, distilled water was added to raise the volume of dispersion to about a liter. The dispersion was then cooled to a room temperature and sufficient distilled water was admixed to bring the final volume to one liter.

Twenty milliliters of the resulting reactant-dye preparation were mixed intimately with twenty milliliters of twenty volume hydrogen peroxide. After a few minutes, this fresh oxidation product dyeing solution was applied to living hair by the common method for home use hair dyes described above. The hair was dyed a jet black. A switch of cut gray human hair relatively similarly dyed with this same dyeing solution was dyed likewise a jet black.

Example 2.—The procedure of Example 1 was repeated with the same materials and in the same quantities except that eighty grams of dopa were used in place of the forty grams used in Example 1. The living hair dyed by the same method with the final fresh oxidation product dyeing solution resulting from the mixture of the reaction-dye preparation with the hydrogen peroxide, was dyed a dark brown. A switch of cut gray human hair also was dyed dark brown.

Increasing the molal relationship of the dopa to the PPDA in either of the foregoing examples reduces the color, for example, from the dark brown of Example 2 to lighter and lighter brown.

Similarly, diluting the reactant-dye composition of either of the foregoing examples, which does not change the molal proportions of the dopa and PPDA, and then admixing the thus diluted solution with the hydrogen peroxide similarly results in corresponding lightening the color to which the hair is dyed.

(B) PPDA with dop-G

Example 3.—(a) Forty grams of finely divided dop-G and twenty grams of finely divided PPDA were intimately dry mixed in a five hundred milliliter beaker. Four hundred milliliters of distilled water were added with stirring in a number of small quantities. The resulting mixture as a slurry was transferred to a one-liter volumetric flask and warmed on a water-bath, with occasional swirling, to about 70° C. The flask then was removed from the water-bath and one hundred milliliters of concentrated ammonium hydroxide (i.e. containing 28% ammonia) were added slowly with mixing. After solution of the dop-G and the PPDA appeared to be complete, distilled water was added to raise the volume of dispersion to about a liter. The dispersion then was cooled to room temperature and sufficient distilled water was admixed to bring the final volume to one liter.

(b) Part (a) of this example was repeated to the point of transferring the slurry to the volumetric flask and heating on the water-bath to about 70° C. Then fifty milliliters of a six percent (6%) aqueous solution of cocoanut fatty alcohol sulfonates were added as wetting agent and followed by 335 milliliters of a three percent aqueous solution of "Carbopol 934" solution as a thickening agent. The mixture then was mixed thoroughly by swirling at a rate low enough to avoid excessive foaming.

The reaction flask was returned to the water-bath and heated to raise the temperature of the mixture to about 70° C. The flask then was removed from the water-bath and one hundred milliliters of concentrated ammonium hydroxide were added slowly with mixing. After solution of the dop-G and the PPDA appeared to be complete, distilled water was added to raise the volume of dispersion to about a liter. The dispersion then was cooled to room temperature and sufficient distilled water was mixed in to bring the final volume to one liter.

Twenty milliliters of each of the resulting reactant-dye compositions of the two parts (a) and (b) of this example were separately intimately mixed with twenty-milliliters of twenty volume hydrogen peroxide. After a few minutes each of these two fresh oxidation product dyeing solutions was applied then separately to living hair by the common method for home use hair dyes as described above. The hair was dyed a jet black. Two separate switches of cut gray human hair relatively similarly separately dyed with each of these two same dyeing solutions respectively were dyed likewise a jet black.

Example 4.—The procedure of each of the parts (a) and (b) of Example 3 was repeated with the same materials and in the same quantities except that eighty grams of dop-G were used in place of the forty grams of it used in Example 3. Living hair dyed by the same method separately with the final fresh oxidation product dyeing solutions resulting from the mixture of each of these two reaction-dye compositions separately with the hydrogen peroxide, was dyed a very dark brown to black. Switches of cut gray human hair also were dyed very dark brown to black.

Increasing the molal relationship of the dop-G to the PPDA in either of the foregoing examples reduces the color, for example, from the jet black of Example 3 to the very dark brown of Example 4 to lighter and lighter brown.

Diluting the reactant-dye preparation of any of the examples with water, for example, even with up to nineteen parts of water, which leaves unchanged the respective molal ratio of the dop-G to the PPDA reactant, and then admixing the diluted composition with the hydrogen peroxide in the same way as in the examples, correspondingly lightens the color to which the living or cut hair is dyed. These results are illustrated by the following:

Example 5.—Five hundred parts of the reactant-dye preparation resulting from the inter-reaction of the dop-G and PPDA of part (a) of Example 3 were diluted uniformly with five hundred parts of distilled water. Twenty milliliters of the resulting diluted reactant-dye composition were intimately mixed with twenty milliliters of twenty volume hydrogen peroxide. Living hair dyed by the same method with this dilute final fresh oxidation product dyeing solution resulting from the mixture of the diluted reaction-dye preparation with the hydrogen peroxide, was dyed a drab light brown. A switch of cut, gray human hair relatively similarly dyed with this same dyeing solution was dyed likewise a drab light brown.

The same results were obtained after similarly diluting the reactant-dye preparation of part (b) of Example 3.

Example 6.—One hundred parts of the reactant-dye preparation obtained in part (a) of Example 3 were diluted uniformly with four hundred parts of distilled water. Twenty milliliters of the resulting further diluted reactant-dye composition were intimately mixed with twenty-milliliters of twenty-volume hydrogen peroxide. Living hair, as well as cut, gray human hair, separately dyed by the same method as described in the preceding example were both dyed a drab light brown.

Example 7.—Example 5 was repeated in all of its details except that the reactant-dye preparations of both parts of Example 3 were replaced by those of both parts of Example 4. The living hair, as well as the cut, gray human hair separately dyed by the same method as described in Example 5 were both dyed a dark brown.

Example 8.—Example 6 was repeated in all of its details except that the reactant-dye preparations of both parts of Example 3 were replaced by those of both parts of Example 4. The living hair, as well as the cut, gray human hair separately dyed by the same method as described in Example 5 were both dyed a light brown.

(C) Dopa with toluenediamines

Example 9.—The procedure of Example 1 was repeated, except that the twenty grams of PPDA were replaced by forty grams of 1-methyl-2,5-diamino-benzene, through the application of the fresh oxidation product dyeing solution to a switch of cut, gray human hair. It was dyed a deep brown with reddish highlights. Increasing the proportion of the dopa gave dyeings that became stronger in the red range, whereas decreasing the proportion of the dopa gave dyeings that were increasingly darker in the brown range.

Example 10.—The procedure of Example 1 was repeated, except that the PPDA was entirely replaced by forty grams of 1-methyl-2,4-diamino-benzene, and continued through the application of the fresh oxidation product dyeing solution to a switch of cut, gray human hair. It was dyed a light brown with reddish blonde highlights. Here also decreasing the proportion of the dopa produced dyeings that were increasingly lighter in the direction of the reddish blonde, whereas increasing the proportion of the dopa yielded dyeings that were increasingly darker in the direction of the light brown.

(D) Dopa and dop-G with meta-phenylenediamine

Example 11.—Repeating the steps of Example 1, but replacing the PPDA entirely with forty grams of meta-phenylenediamine, and after applying the fresh oxidation product dyeing solution to a switch of cut, gray human hair, it was dyed a medium brown with a reddish cast.

Example 12.—Repeating the steps of Example 11, but replacing the dopa entirely by the same quanitiy of dop-G, and after applying the fresh oxidation product dyeing solution to a switch of cut, gray human hair, it was dyed a more pronounced brown with less reddish cast, than the dyeing obtained in Example 11.

(E) Dopa and dop-G with ring-substituted aminophenols

Example 13.—Forty grams of finely divided dopa and forty grams of finely divided 2,4-diaminophenol were intimately dry mixed in a five hundred milliliter beaker. Four hundred milliliters of distilled water were added with stirring in a number of small quantities. The resulting mixture as a slurry was transferred to a one-liter volumetric flask and warmed on a water-bath, with occasional swirling, to about 70° C. Fifty milliliters of a six (6%) percent aqueous solution of cocoanut fatty alcohol sulfonates then were added as wetting agent and followed by 335 milliliters of a three percent aqueous solution of "Carbopol 934" solution as a thickening agent. The mixture was then thoroughly mixed by swirling at a rate low enough to avoid excessive foaming.

The reaction flask was returned to the water-bath and heated to raise the temperature of the mixture to about 70 °C. The flask then was removed from the water-bath and one hundred milliliters of concentrated ammonium hydroxide (i.e. containing 28% ammonia) were added slowly with mixing by swirling. After solution of the dopa and the 2,4-diaminophenol appeared to be complete, distilled water was added to raise the volume of dispersion to about a liter. The dispersion then was cooled to room temperature and sufficient distilled water was mixed in to bring the final volume to one liter.

Twenty milliliters of the resulting reactant-dye preparation was intimately mixed with twenty milliliters of 20 volume hydrogen peroxide. After a few minutes, this fresh oxidation product dyeing solution was applied to living hair by the common method for home use hair dyes as described above. The hair was dyed a relatively dark brown. A switch of cut gray human hair relatively similarly dyed with this same dyeing solution was dyed likewise a relatively dark brown.

Example 14.—The procedure of Example 13 was repeated except that forty grams of 2-amino-4-sulfonic acid-phenol were used in place of the 2,4-diaminophenol used in Example 13. The living hair dyed by the same method with the final fresh oxidation product dyeing solution resulting from the mixture of the reaction-dye preparation with the hydrogen peroxide, was dyed a bronze copper. A switch of cut gray human hair also was dyed bronze copper.

Example 15.—The procedure of Example 14 was repeated except that forty grams of dop-G were used in place of the dopa used in Example 14. The living hair dyed by the same method with the final fresh oxidation product dyeing solution resulting from the mixture of the reaction-dye composition with the hydrogen peroxide, was dyed a bronze copper. A switch of cut gray human hair also was dyed bronze copper.

Increasing the molal relationship of the dopa or dop-G to the 2,4-diaminophenol in either of the foregoing examples lightens the color, for example, from the relatively dark brown of Example 13 to lighter and lighter brown, and from the bronze copper of Examples 14 and 15 to lighter and lighter bronze copper to blonde.

Similarly, diluting the reactant-dye compostion of either of the foregoing examples with water, and then admixing the thus diluted solution with the hydrogen peroxide similarly results in corresponding lightening the color to which the hair is dyed.

Example 16.—The procedure of Example 13 was repeated except that its diaminophenol was replaced by ten grams of 5-aminosalicylic acid and sixty milliliters of concentrated ammonium hydroxide were used instead of one hundred milliliters of it. The living hair dyed by the same method with the final fresh oxidation product dyeing solution resulting from the mixture of the reaction-dye composition with the hydrogen peroxide, was dyed a blonde. A switch of cut gray human hair also was dyed blonde.

Example 17.—The procedure of Example 16 was repeated except that the 5-aminosalicylic acid was replaced by the same quantity of para-aminosalicylic acid (often called PAS), and also dyed hair blonde.

Decreasing the molal relationship of the dopa to the amino-salicylic acid in Examples 16 and 17 results in progressively darkening the color of the dyed hair to darker and darker blonde to brown.

(F) Dopa and dop-G with N-substituted aminophenols

Example 18.—Forty grams of finely divided dopa and thirty-four and one-tenth grams of finely divided N-methyl - para - amino - phenol hydrogen sulfate (i.e. "Metol") were intimately dry mixed in a five hundred milliliter beaker. Four hundred milliliters of distilled water were added with stirring in a number of small quantities. The resulting mixture as a slurry was transferred to a one-liter volumetric flask and warmed on a water-bath, with occasional swirling, to about 70° C. Fifty milliliters of a six (6%) percent aqueous solution of cocoanut fatty alcohol sulfonates then were added as wetting agent and followed by 335 milliliters of a three percent aqueous solution of "Carbopol 934" solution as thickening agent. The mixture then was mixed thoroughly at a rate low enough to avoid excessive foaming.

The reaction flask was returned to the water-bath and heated to raise the temperature of the mixture to about 70° C. The flask then was removed from the water-bath and one hundred milliliters of concentrated ammonium hydroxide (i.e. containing 28% ammonia) were added slowly with mixing. After solution of the dopa and the N - methyl - para - aminophenol hydrogen sulfate (i.e. "Metol") appeared to be complete, distilled water was added to raise the volume of dispersion to about a liter. The dispersion then was cooled to room temperature and sufficient distilled water was mixed in to bring the final volume to one liter. Twenty milliliters of the resulting reactant-dye composition was intimately mixed with twenty milliliters of twenty volume hydrogen peroxide. After a few minutes, this fresh oxidation product dyeing solution was applied to living hair by the common method for home use hair dyes as described above. The hair was dyed a dark brown. A switch of cut gray human hair relatively similarly dyed with this same dyeing solution was dyed likewise a dark brown.

Repeat of Examples 1, 3(b), 13 and 18 without using the wetting agent and the thickening agent gave in each case respectively the same resulting finished dyeing colors as was obtained in those examples.

Example 19.—The procedure of Example 18 was repeated except that forty grams of dop-G were used in place of the dopa used in Example 18 and thirty-six and seven-tenths grams of "Metol" were used. The living hair dyed by the same method with the final fresh oxidation product dyeing solution resulting from the mixture of the reaction-dye preparation with the hydrogen peroxide, was dyed a dark brown. A switch of cut gray human hair relatively similarly dyed with this same dyeing solution also was dyed dark brown.

Example 20.—The procedure of Example 18 was repeated except that a higher quantity, namely, forty grams of "Metol" were used. The living hair dyed by the same method with the final fresh oxidation product dyeing solution resulting from the mixture of the reaction-dye preparation with the hydrogen peroxide, was dyed a slightly darker brown than in Example 18. A switch of cut, gray human hair relatively similarly dyed with this same dyeing solution also was dyed a slightly darger brown than in Example 18.

Example 21.—The procedure of Example 19 was repeated except that a higher quantity, namely, forty grams of "Metol" were used. The living hair dyed by the same method with the final fresh oxidation product dyeing solution resulting from the mixture of the reaction-dye preparation with the hydrogen peroxide, was dyed a slightly darker brown than in Example 20. A switch of cut gray human hair relatively similarly dyed with this same dyeing solution also was dyed a slightly darger brown than in Example 20.

Example 22.—The procedure of Example 18 was repeated except that the "Metol" was replaced by thirty-three and two-tenths grams of N-carboxymethyl-para-aminophenol (i.e. "Glycin"). Living hair dyed by the same method with the final fresh oxidation product dyeing solution resulting from the mixture of the reaction-dye preparation with the hydrogen peroxide, was dyed a strawberry blonde. A switch of cut, gray human hair relatively similarly dyed with this same dyeing solution was also dyed a strawberry blonde.

Example 23.—The procedure of Example 22 was repeated except that the dopa was replaced by the same weight of dop-G and thirty-five and seven-tenths grams of "Glycin" were used. Living hair dyed by the same method with the final fresh oxidation product dyeing solution resulting from the mixture of the reaction-dye preparation with the hydrogen peroxide, was dyed a light auburn. A switch of cut, gray human hair relatively similarly dyed with this same dyeing solution was also dyed a light auburn.

Example 24.—The procedure of Example 22 was repeated except that a higher quantity, namely, forty grams of "Glycin" were used. The living hair dyed by the same method with the final fresh oxidation product dyeing solution resulting from the mixture of the reaction-dye preparation with the hydrogen peroxide, was dyed a slightly darker strawberry blonde than in Example 22. A switch of cut, gray human hair relatively similarly dye with this same dyeing solution also was dyed a slightly darker strawberry blonde than in Example 22.

Example 25.—The procedure of Example 23 was repeated except that a higher quantity, namely, forty grams of "Glycin" were used. The living hair dyed by the same method with the final fresh oxidation product dyeing solution resulting from the mixture of the reaction-dye preparation with the hydrogen peroxide, was dyed a slightly darker auburn than in Example 23. A switch of cut, gray human hair relatively similarly dyed with this same dyeing solution also was dyed a slightly darker auburn than in Example 23.

Increasing the molal proportion of the dopa or dop-G, for example, as in the foregoing Examples 20, 21, 24 and 25 over that in Examples 18, 19, 22 and 23 respectively, slightly lightens the color of the resulting hair dye under similar dyeing conditions.

Example 26. The procedure of Example 18 was repeated except that the "Metol" was replaced by thirty-three and six-tenths grams of para-aminophenol hydrochloride and four hundred milliliters of propylene glycol first were added with stirring in place of distilled water as the suspending vehicle for the initial reactant. Living hair dyed by the same method with the final fresh oxidation product dyeing solution resulting from the mixture of the reaction-dye preparation with the hydrogen peroxide, was dyed auburn. A switch of cut, gray human hair relatively similarly dyed with this same dyeing solution was also dyed auburn.

Example 27.—The procedure of Example 26 was repeated except that the dopa was replaced by the same quantity of dop-G. Living hair dyed by the same method with the final fresh oxidation product dyeing solution resulting from the mixture of the reaction-dye preparation with the hydrogen peroxide, was dyed auburn. A switch of cut; gray human hair relatively similarly dyed with this same dyeing solution also was dyed auburn.

Example 28.—The procedure of Example 18 was repeated except that double the weight of dopa was used and the "Metol" was replaced by twenty grams of para-aminophenol. Live hair dyed by the same method with the final fresh oxidation product dyeing solution resulting from the mixture of the reaction-dye preparation with the hydrogen peroxide, was dyed a somewhat lighter auburn than in Example 26. A switch of cut, gray human hair relatively similarly dyed with this same dyeing solution also was dyed a somewhat lighter auburn than in Example 26.

Example 29.—The procedure of Example 28 was repeated except that the dopa was replaced by the same weight of dop-G. Live hair dyed by the same method with the final fresh oxidation product dyeing solution resulting from the mixture of the reaction-dye preparation with the hydrogen peroxide, was dyed a somewhat lighter auburn than in Example 27. A switch of cut, gray human hair relatively similarly dyed with this same dyeing solution also was dyed a somewhat lighter auburn than in Example 27.

Example 30.—The procedure of Example 28 was repeated except that the para-aminophenol was replaced by the same weight of ortho-aminophenol. Living hair dyed by the same method with the final fresh oxidation product dyeing solution resulting from the mixture of the reaction-dye preparation with the hydrogen peroxide, was dyed auburn. A switch of cut, gray human hair relatively similarly dyed with this same dyeing solution was also dyed auburn.

Example 31.—The procedure of Example 30 was repeated except that the dopa was replaced by the same quantity of dop-G. Living hair dyed by the same method with the final fresh oxidation product dyeing solution resulting from the mixture of the reaction-dye preparation with the hydrogen peroxide, was dyed auburn. A switch of cut, gray human hair relatively similarly dyed with this same dyeing solution was also dyed auburn.

Example 32.—The procedure of Example 30 was repeated except that half the weight of dopa was used and twenty-one and seven-tenths grams of ortho-aminophenol were used. Living hair dyed by the same method with the final fresh oxidation product dyeing solution resulting from the mixture of the reaction-dye preparation with the hydrogen peroxide, was dyed henna-red. A switch of cut, gray human hair relatively similarly dyed with this same dyeing solution was also dyed henna-red.

Example 33.—The procedure of Example 31 was repeated except that half the quantity of dop-G was used and the ortho-aminophenol was replaced by twenty-three and three-tenths grams of metal-aminophenol. Live hair dyed by the same method with the fresh oxidation product dyeing solution resulting from the mixture of the reaction-dye preparation with the hydrogen peroxide, was dyed a medium auburn. A switch of cut, gray human hair relatively similarly dyed with this same dyeing solution was dyed likewise a medium auburn.

Decreasing the molal ratio of the dopa or dop-G to the aminophenol (substituted or unsubstituted) reactant ordinarily gives a darker shade of the resulting color of the dyed hair or a generally darker color, barring interfering changes in operating conditions or the presence of other reagents that also influence the depth or change in the color.

For example, inclusion of increasing amounts of PPDA along with the dopa or dop-G and aminophenol (substituted or unsubstituted) in a formulation embraced by this invention ordinarily progressively darkens the shade of the color of the dyed hair or gives a darker color, compared to what results without the PPDA, and at the same time without the sensitization-provoking shortcomings of PPDA. These results occur with PPDA used even to the extent of three mols of it per mol of dopa. This feature of the invention is illustrated by the following:

Example 34.—The procedure of Example 20 was repeated using its same amounts of dopa and "Metol" reespectively, and including also at the start three grams of PPDA admixed with them. Living hair dyed by the same method with the final fresh oxidation product dyeing solution resulting from the mixture of the reaction-dye preparation with the hydrogen peroxide, was dyed a warm ebony brown. A switch of cut, gray human hair relatively similarly dyed with this same dyeing solution was dyed likewise a warm ebony brown.

Example 35.—The procedure of Example 34 was repeated except for using five grams of PPDA. Living hair dyed in the same way was dyed a slightly darker warm ebony brown than that in Example 34, and so also was a switch of cut, gray human hair when relatively similarly dyed.

Example 36.—The procedure of Example 35 was repeated except for using seven and one-half grams of PPDA. Living hair dyed in the same way was dyed a still slightly darker warm ebony brown than that in Example 35, and so also was a switch of cut, gray human hair when relatively similarly dyed.

Example 37.—The procedure of Example 36 was repeated except for using ten grams of PPDA. Living hair dyed in the same way was dyed an even still slightly darker warm ebony brown than that in Example 36, and so also was a switch of cut, gray human hair when relatively similarly dyed.

Example 38.—The procedure of Example 20 was repeated using the same amount of dopa, only twenty-eight grams of "Metol" and four grams of PPDA admixed therewith. Living hair dyed in the same way with the resulting fresh oxidation product dyeing solution was dyed a warm dark brown, and so also was a switch of cut, gray human hair when relatively similarly dyed.

Example 39.—The procedure of Example 22 was repeated using the same amount of dopa, twenty-seven and two-tenths grams of "Glycin" and four grams of PPDA admixed with them at the start. Living hair dyed in the same way with the resulting fresh oxidation product dyeing solution was dyed a dark auburn, and so also was a switch of cut, gray human hair when relatively similarly dyed.

Diluting the reactant-dye preparation of any of the examples with water, for example, even with up to nineteen parts of water, which leaves unchanged the respective molal ratio of the dopa or dop-G to the specific aminophenol (substituted or unsubstituted) reactant, and then admixing the diluted composition with the hydrogen peroxide correspondingly lightens the color to which the living or cut hair is dyed. These results are illustrated by the following:

Example 40.—Three parts of the reactant-dye preparation resulting from the inter-reaction of the dopa and "Metol" of Example 18 were diluted uniformly with seven parts of distilled water. Twenty milliliters of the resulting diluted reactant-dye preparation were mixed intimately with twenty milliliters of twenty volume hydrogen peroxide. Living hair dyed by the same method with this dilute final fresh oxidation product dyeing solution resulting from the mixture of the diluted reaction-dye preparation with the hydrogen peroxide, was dyed a warm blonde. A switch of cut, gray human hair relatively similarly dyed with this same dyeing solution was dyed likewise a warm blonde.

Example 41.—Fifty parts of the reactant-dye preparation resulting from the inter-reaction of the dopa and "Glycin" of Example 22 were diluted uniformly with fifty parts of distilled water. Twenty milliliters of the resulting diluted reactant-dye prepartaion were mixed intimately with twenty milliliters of twenty volume hydrogen peroxide. Living hair dyed by the same method with this dilute final fresh oxidation product dyeing solution resulting from the mixture of the diluted reaction-dye preparation with the hydrogen peroxide, was dyed a dark warm blonde. A switch of cut, gray human hair relatively similarly dyed with this same dyeing solution was dyed likewise a dark warm blonde.

Some reactant-dye preparations produced, for example, from reacting together dopa and meta-aminophenol in certain proportions, yield after admixture with the oxidizing agent a final fresh oxidation product dyeing solution which produces on keratinous fibers a color which by itself would not ordinarily be suitable for dyeing living hair. However, such dyeing solutions can be used on other keratinous fibers.

Also such reactant-dye preparation yielding a final dye color that ordinarily would be unsuitable on living hair, can serve as a toning agent, i.e. a drabbing agent, for admixture with some other reactant-dye preparation or preparations, to produce with such latter a satisfactory variant final color from that ordinarily obtainable from it, which variant color is suitable for use on living hair as well as on other keratinous fibers.

Such toning, or so-called drabbing, agents are illustrated by the following:

Example 42.—The procedure of Example 33 is repeated except for replacing its dop-G with an equal amount of dopa and increasing the meta-aminophenol to forty grams. A switch of cut, gray human hair dyed as in the previous examples with the final fresh oxidation dyeing solution resulting from the mixture of the reactant-dye preparation with the hydrogen peroxide was dyed a greenish blonde.

Example 43—The procedure of Example 42 was repeated except for reducing the meta-aminophenol to twenty-one and seven-tenths grams. Its reactant-dye composition after similar admixture with the hydrogen peroxide, gave a final fresh oxidation product dyeing solution which likewise produced on cut, gray human hair a slightly lighter greenish blonde than that of Example 42.

Example 44—Seventy parts of the reactant-dye preparation resulting from the inter-reaction of the dop-G and meta-aminophenol of Example 33 was intimately diluted with thirty parts of distilled water. Twenty milliliters of this diluted reactant-dye preparation intimately admixed with twenty milliliters of twenty volume hydrogen peroxide, gave a final fresh oxidation product dyeing solution that dyed cut, gray human hair a greenish-brown, by the method used for dyeing it in the other examples.

Any of the reactant-dye preparations which, after admixture with the hydrogen peroxide, produced these colors on cut, gray human hair in these Examples 42, 43 and 44, is useful as a toning or drabbing agent for admixture with one or more other reactant-dye preparations to give variants from them that yield dyeing colors that are suitable for dyeing living hair. Such a variant combination is shown, for example, by the following:

Example 45.—Seventy-five parts of the reactant-dye preparation of Example 22 is admixed with twenty-five parts of the reactant-dye preparation of Example 43, with the result that the greenish blonde of the product of Example 43 modifies the strawberry blonde of Example 22 to a drab blonde (i.e. on the ashen side) and suitable for use on living hair.

(G) Dopa with ring-substituted diaminobenzenes

Example 46.—Repeating the steps of Example 11, but replacing the PPDA entirely by forty grams of 1-nitro-2,5-diaminobenzene, and after applying the fresh oxidation product dyeing solution to a switch of cut gray human hair, it was dyed a brick red that can be designated a flambuoyant auburn.

Example 47.—Repeating the steps of Example 11, but replacing the PPDA entirely by forty grams of 1-methoxy-2,4-diaminobenzene, and after applying the fresh oxidation product dyeing solution to a switch of cut gray human hair, it was dyed a relatively dark brown with a somewhat perceptible reddish cast. Decreasing the proportion of the dopa resulted in increasingly darker dyeings in the brown range, whereas increasing the proportion of the dopa resulted in increasing the reddish brown cast.

In the foregoing examples using dopa, the synthetic (or racemic) dopa was used. It can be replaced in part or whole by a corresponding quantity of any of its other forms, for example, the natural (or laevo-rotatary) form, or by another suitable dihydroxyphenylalanine having its hydroxyls ortho to one another.

Instead of using the dopa or dop-G in the free acid form, the equivalent quantity of a water-soluble salt of either of them can be used, for example, an alkali metal salt such as the sodium or potassium salt, or the ammonium salt, or a lower alkanolamine salt such as a mono-, di- or triethanolamine salt. On solution in water, such salt can produce a pH above seven and even around eight, and then require addition of a smaller amount of alkalizing agent to give the desired alkaline conditions for the reaction to produce the reactant-dye. Accordingly, the reference to either a dihydroxyphenylalanine or a dihydroxyphenylglycine, wherein the hydroxyls are ortho to one another, or to any 3,4-dihydroxyphenylalanine or to 3,4-dihydroxyphenylglycine in the appended claims is to be construed as involving any of these corresponding water-soluble salts as equivalents of the respectively corresponding free acid.

The specific phenylamine used in various of the examples also can be replaced in part or as a whole by some other one of the various types disclosed herein, with corresponding variation in color. The dyes obtained likewise appear similarly significantly free of the sensitization-provoking shortcoming shown by the phenylamines when used alone. For example, the para-phenylenediamine can be replaced in whole or part by a corresponding quantity of another suitable phenylenediamine.

Similar replacement of any aminophenol used in various examples can be made (in part or as a whole) by some other aminophenol covered by the general formula given and described in the first paragraph of this specification. They can have the formula $HO \cdot C_6H_4 \cdot NR$ wherein R is hydrogen, lower alkyl having from one to six carbon atoms such as methyl, ethyl, propyl, or butyl, or carboxymethyl, or acetyl, and the nitrogen is ortho, meta, or para to the hydroxyl group. They and their mineral acid and aliphatic acid addition salts such as the hydrochloride, sulfate, acetate, citrate, maleate, and the like are briefly jointly broadly called herein the "aminophenol compounds."

These applicable aminophenol compounds include, for example, the unsubstituted aminophenols para-aminophenol, meta-aminophenol and ortho-aminophenol; N-substituted aminophenols as carboxymethyl-substituted such as N-carboxymethyl-para-aminophenol, or acetyl-substituted as N-acetyl-para-aminophenol (otherwise called para-acetylaminophenol), or lower alkyl-substituted as in N-methyl - para - aminophenol sulfate (i.e. "Metol"), N-(normal)butyl-para-aminophenol; as well as acid addition salts such as a mineral acid salt as a hydrochloride as para-aminophenol hydrochloride, or a sulfate such as is "Metol," or the sulfate of its N-butyl homolog.

Neither the wetting agent nor the thickening agent included in various of the examples is essential to the production of the reactant-dye. A compatible wetting agent serves ordinarily to facilitate penetration of the hair. A compatible thickening agent serves to reduce flow or drainage from the hair. Either or both can be omitted or separately replaced in whole or part by any other compatible wetting agent or suspending or thickening agent respectively, that is innocuous in its final concentration in the fresh oxidation product dyeing solution, or can be included after the reactant-dye has been produced.

Other compatible thickening agents are exemplified by different amounts of the various molecular weights of polyvinylpyrrolidone, or guar gum (i.e. the refined endosperm of guar seed separated from the seed germ and hull, a cold water-soluble polysaccharide consisting principally of a complex carbohydrate polymer of galactose and mannose, and better termed a galactomannon). Inclusion of a thickening agent generally is advisable in the product to be sold for home use as well as in the one for salon use.

"Carbopol 934" is generically called carboxypolymethylene and is a vinyl polymer with active carboxyl groups, a white, free-flowing powder, highly ionic and slightly acidic synthetic hydrophilic colloid product of B. F. Goodrich Chemical Co.

The dopa or dop-G and PPDA, para-toluenediamine, or aminophenol (unsubstituted or ring- or N-substituted) in any of the examples or other reactant-dye preparations based on them can be accompanied, or either or both of them replaced only in part, and generally in a minor part, by one or more of the polyhydric phenols such as the dihydric phenols as catechol, hydroquinone, and resorcinol, or the carbonyl-dihydric phenols as vanillin, protocatechuic acid and its corresponding aldehyde, or the trihydric phenols as pyrogallol (i.e. pyrogallic acid), and the like, to assist, for example, in influencing the development of various tones or shades such as henna, deep reds, and auburns. The specific resulting color produced in the dyed hair or other fiber is influenced by the relative proportions of these various reactants to one another, their respective concentrations in the aqueous media, and the time that the fresh oxidation product dyeing solution remains in contact with the hair or other fibers. A sample test on a lock or switch of hair, piece of fur, or skein of other keratinous fiber, of the type ordinarily run in this art, can show whether the resulting color or its shade or tone is what is desired.

The ammonium hydroxide can be replaced in whole or in part by any other compatible alkalizing agent innocuous to the scalp or fur or pelt at its final concentration in the ultimate fresh oxidation product dyeing solution. So also while hydrogen peroxide is advantageous as the oxidizing agent, it can be replaced in whole or part by any other compatible oxidizing agent that is innocuous at its final concentration in the ultimate fresh oxidation dyeing solution.

Instead of using distilled water in preparing the reactant-dye products, de-ionized water can be used. Either distilled or de-ionized water is preferred in preparing the reactant-dye preparations in market packages to stand up under shelf life. Ordinarily, average good quality city water can be suitable where the reactant-dye preparations are to be used in preparing a dye-bath for fur, wool, or other loose keratinous fibers.

The reactant-dyes of the invention are water-dispersible in the usual generic sense as embracing true solutions of these reactant-dyes in water or any aqueous medium within the bounds of the invention as well as stable homogeneous colloidal solutions of them in such aqueous medium. Thus, the aqueous-medium includes the aqueous alkaline medim resulting from the alkalizing agent used either merely to provide the alkalinity or to enhance the dissolution of some organic reactant in the water. It includes also any aqueous medium containing, for example, a sufficient amount of any oxygenated lower aliphatic mono- or dihydric alcohol employed as a common solvent to enhance the solution of some organic reactant, for example, any lower aliphatic alcohol as ethanol, methanol, propanol or iso-propanol, or lower aliphatic glycol such as propylene glycol, and the like.

The reactant-dye of any of the various illustrative examples, as well as any other produced according to the invention, can be obtained in the dry state by removing the aqueous vehicle and any included common solvent, by a procedure that avoids oxidation or decomposition of, or any other deleterious effect on, the reactant-dye. Thus, for example, the reactant-dye can be removed by lyophilization from the aqueous vehicle, with or without any contained added common solvent, in which it is dispersed (either in true solution or colloidal dispersion). Accordingly, the aqueous dispersion of the reactant-dye can be frozen and in the frozen state subjected to high vacuum to sublime away the frozen vehicle and leave behind the dry reactant-dye.

Alternatively, the dispersion of reactant-dye can be spray dried under conditions to avoid deleterious change in it, for example, by spraying it into an inert atmosphere, for example, carbon dioxide or nitrogen, or air mixed with either of them sufficiently to reduce its oxygen content to a harmless point, with or without using a spraying medium inert to the reactant-dye. Such medium can be a gas or mixture of gases as just mentioned for the inert atmosphere.

Such dried reactant-dye then can be put up either as a free running powder in bottles or powder papers (such as used for pharmaceuticals) or even can be tabletted. For tablets, it can be helpful and desirable in some cases to incorporate a suitable compatible ingredient to enhance their disintegration when placed in water. In packaging the reactant-dye in any of these dry forms, it is beneficial to have the container filled sufficiently to leave in it as little air as possible and to close it tightly to avoid, while not in use, replacement of the air already in the package.

Advantageously, such powder paper or tablet can contain enough reactant-dye for a complete single dye treatment, for example, when prepared for dyeing hair on the head. When to be used, the reactant-dye either can be dissolved or otherwise dispersed in a separate suitable quantity of water and then mixed with the required amount of oxidizing agent solution, or it can be added directly to, and dissolved, in water already containing the required amount of the oxidizing agent.

The dry reactant-dye powder can be used for permanent dyeing by stirring a given quantity into a stated volume of water having dissolved in it sufficient of any of the alkalizing agents described above to give the resulting solution a pH above about eight and in the range already stated for the reactant-dye solution before it is mixed with the oxidizing agent. Alternatively, the dry reactant-dye powder can be mixed with a powdered, water-soluble, preferably non-hygroscopic, solid alkali, for example, ammonium carbonate, innocuous in its final concentration in the final dyeing solution, and in such ratio that when a given quantity of the dry mixture is stirred into a prescribed volume of water, the pH of the resulting solution is within the range shown hereinabove.

In general, the various oxidation product dyeing solutions containing any of the various reactant-dyes described can be applied with good results to living, e.g. human, hair whether or not it had been previously washed. Hairs dyed with the oxidation product dyeing solutions containing the reactant-dyes of the invention, in addition to being fast to washing and sunlight, indicate compatibility with hair waving compositions.

These dyeing solutions can be used on any kind of growing human hair, whether straight, naturally curly or artificially permanently waved, or tinted, dyed or bleached. Pre-bleaching is needed only when the hair is to be dyed to a lighter color or shade.

Hair dyed with the dyeing solutions of the invention retains its natural texture and gloss, and does not look artificially dyed. Naturally coarse and/or tough to handle hair, after dyeing with these solutions is more manageable, easy to comb, handle, and set, and more natural looking in lustre and sheen and without inducing friability or injury to the hair shaft.

Hair dyed with the dyeing solutions of this invention has distinct color fastness, is highly resistant to change on exposure to the air, sunlight, rain, salt water, and shampooing. The hair dye is long lasting and requires touching up only of new hair growth.

What is claimed is:

1. The method of preparing a colored composition of matter comprising a water-dispersible reactant-dye, which method comprises dispersing in an aqueous medium (a) an aliphatic aminoacid having the formula

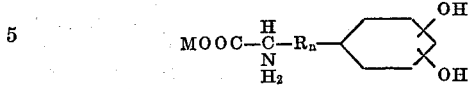

wherein R is the divalent radical

and $n$ is zero or one, and M is hydrogen, an alkali metal or the ammonium group, and the hydroxyl groups are ortho to one another, and (b) a phenylamine having the formula

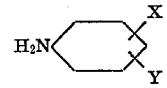

wherein X is hydrogen, or the methyl, methoxy, nitro, amino, sulfonic acid or carboxylic acid group; Y is hydroxyl or the group —NHR wherein R is hydrogen, lower alkyl of one to six carbon atoms, or the carboxymethyl or acetyl group; and when Y is the hydroxyl group, X is hydrogen or the amino group; and when Y is the group —NHR, X is as hereinabove described other than the amino group; and in the proportion of about one-third of a mole of said aminoacid (a) per mole of the phenylamine (b); and, in the presence of a dissolved compatible alkalizing agent providing a pH of from about 8 to about 11, allowing said aminoacid (a) and the phenylamine (b) to react together for a time within about ten minutes until the reaction has become substantially inactive.

2. The method as claimed in claim 1, wherein the aliphatic amino acid is selected from the group consisting of beta-3,4-dihydroxyphenylalanine and alpha - 3,4-dihydroxyphenylglycine.

3. The method as claimed in claim 2, wherein after the reaction has become substantially inactive, the reaction mixture is dried under drying conditions which avoid oxidation of the reactant-dye contained therein.

4. The method as claimed in claim 2, wherein Y is the amino group and para to the other amino group, and X is hydrogen, whereby the resulting phenylenediamine is para-phenylenediamine.

5. The method as claimed in claim 4, wherein the alkalizing agent is ammonia.

6. A colored composition of matter comprising a water-dispersible reactant-dye effective for dyeing human hair with significant fastness to light and water, which composition is the product of the reaction as claimed in claim 2.

7. A colored composition of matter as claimed in claim 6, wherein Y is —NHR and para to the other amino group.

8. The method of dyeing keratinous fibers, which comprises applying to them, for a time sufficient for the desired color and shade to develop on them, an aqueous oxidation dyeing solution prepared by mixing together uniformly (a) an aqueous alkaline, reactant-dye containing colored composition as claimed in claim 6 and (b) an oxidizing agent compatible with the reactant-dye composition and with the keratinous fibers under the dyeing conditions, and in a quantity sufficient to yield an effective concentration of oxidizing agent in relation to the reactant dye concentration in its composition and its concentration in the oxidation dyeing solution for the color and shade to be developed on the keratinous fiber.

9. The method of dyeing keratinous fibers as claimed in claim 8, wherein the fibers are living hair on the head, and the oxidizing agent is hydrogen peroxide, and the alkaline conditions are provided by ammonium hydroxide.

10. A colored composition of matter as claimed in claim 6, wherein the aliphatic amino acid is beta-3,4-dihydroxyphenylalanine.

11. A colored composition of matter as claimed in claim 6, wherein the aliphatic amino acid is alpha-3,4-dihydroxyphenylglycine.

12. The method of dyeing fibers as claimed in claim 9, wherein the reactant-dye containing composition used in preparing said aqueous oxidation dyeing solution applied to said fibers is the product of the reaction of one or both of beta-3,4-dihydroxyphenylalanine and alpha-3,4 - dihydroxyphenylglycine with para-phenylenediamine under said alkaline conditions.

13. The method of preparing a composition of matter as claimed in claim 2, wherein the phenylamine is para-acetylaminophenol, para-carboxymethylaminophenol, para-alkylaminophenols with alkyl of one to six carbon atoms, para-aminophenol, ortho-aminophenol, meta-aminophenol, para-aminosalicylic acid, 5 - aminosalicylic acid, 2,4 - diaminophenol, 2-amino-4-sulfonic acid phenol, or 2,4-diamino-6-nitrophenol.

14. A composition of matter comprising a water-dispersible reactant-dye effective for dyeing human hair with significant fastness to light and water, which composition is the product of the reaction as claimed in claim 13.

15. A composition of matter as claimed in claim 14, wherein its reactant-dye comprising composition product of said reaction is that of one or more of said aminophenols and the amino acid beta-3,4 - dihydroxyphenylalanine.

16. A composition of matter as claimed in claim 14, wherein its reactant-dye comprising composition product of said reaction is that of one or more of said aminophenols and the amino acid alpha-3,4-dihydroxyphenylglycine.

17. A composition as claimed in claim 15, wherein the one or more of said aminophenols is N-substituted.

18. A composition as claimed in claim 15, wherein the one or more of said aminophenols is ring-substituted.

19. The method as claimed in claim 13, wherein the alkalizing agent is ammonia dissolved in the aqueous medium to the extent to make the alkalinity from about pH 8 to about pH 11.

References Cited

UNITED STATES PATENTS 2,875,769   3/1959   Rosmarin et al. _____ 132—7

ALBERT T. MEYERS, Primary Examiner

V. C. CLARKE, Assistant Examiner

U.S. Cl. X.R.

8—11, 79; 260—501.11